Dec. 1, 1925.
J. W. STICKLEY ET AL
1,564,147
SINKER
Filed June 28, 1921
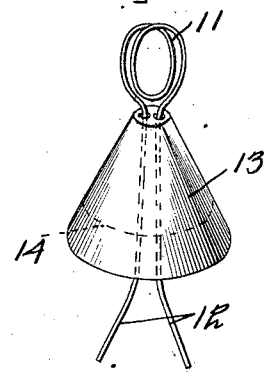
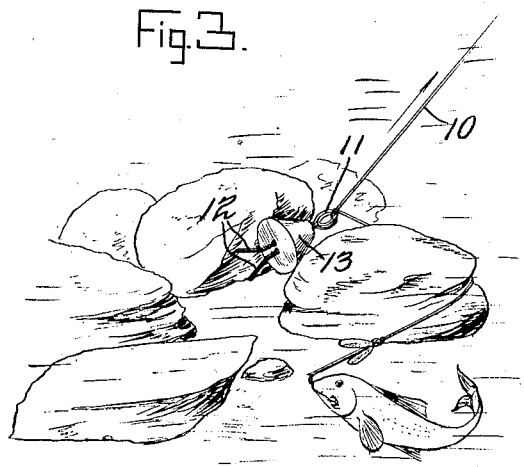
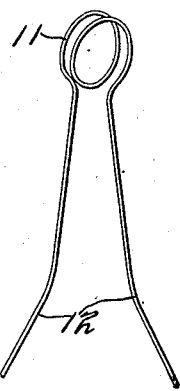
Inventor
Aaron T. Rossignol.
John W. Stickley
By
Attorney Patented Dec. 1, 1925.

1,564,147

UNITED STATES PATENT OFFICE.

JOHN W. STICKLEY AND AARON T. ROSSIGNOL, OF WASHINGTON, DISTRICT OF COLUMBIA.

SINKER.

Application filed June 28, 1921. Serial No. 481,038.

*To all whom it may concern:*

Be it known that we, JOHN W. STICKLEY and AARON T. ROSSIGNOL, citizens of the United States, residing at Washington, in the District of Columbia, have invented certain new and useful Improvements in Sinkers, of which the following is a specification.

Our said invention relates to an improved sinker for fishing lines and it is an object of the invention to provide a releasing means whereby the line may be freed if the sinker becomes entangled in weeds or hangs up on rocks or is in any other way held against movement with the line. In fishing it frequently happens that the sinker is held against movement in one way or another and this results in the loss of the hook, line and sinker and oftentimes of a fish as well. By the use of our device the line may be freed from the sinker and thus the line and hook may often be saved as well as the fish empaled on the hook.

Referring to the accompanying drawings which are made a part hereof and on which similar reference characters indicate similar parts, Figure 1 is an elevation of our improved device, Figure 2 is a detail of the releasing means, and Figure 3 illustrates the device in operation.

In the drawings 10 indicates a fishing line to which a member 11 is connected by a knot in ordinary manner. The member 11 is made of chilled spring brass wire so as to be very resilient for its weight. The free ends 12—12 of the releasing member 11 pass through parallel openings in a body member 13 of lead or other heavy material, which is preferably conical in form. The coiled upper end acts as a coil spring and the ends 12 of the wire are bent outwardly to increase their holding effect. As indicated by the dotted line at 14 the sinker bodies may be of various lengths and of any desired weight as usual.

In operation if the body 13 should be hung up between stones as shown in Figure 3 or be held fast in any way a pull on the line will draw the wire releasing device out of the body and the fish may then be played as usual or at least the line and hook may be recovered. A new sinker body is then attached to the releasing device and operations are resumed.

It will be evident that our device may be modified in various ways without departing from the scope of the appended claims and the spirit of the invention. It may also be found useful in other relations as in situations where a temporary anchor is required which shall release itself on the occurrence of some predetermined event. Therefore we do not limit ourselves to the specific device shown in the drawings and described in the specification nor to the specified use therefor.

Having thus fully described our said invention, what we claim as new and desire to secure by Letters Patent, is:

1. In a device of the character described, a body of heavy material having parallel openings, and a releasing device of bent wire having means for attachment to a line, and having portions adapted to enter said openings, said portions being bent to hold them frictionally in said openings, substantially as set forth.

2. A sinker comprising a body tapering toward one end and having openings extending from end to end thereof, and a hair-pin shaped device adapted to be attached to a line and to have its legs engage frictionally in said openings, substantially as set forth.

3. A sinker comprising a body tapering toward one end and having openings extending from end to end thereof, and a hair-pin shaped device adapted to be attached to a line and to have its legs engage frictionally in said openings, said legs being bent at their lower projecting ends to increase their holding effect, substantially as set forth.

In witness whereof, we have hereunto set our hands and seals at Washington, District of Columbia, this twenty-fifth day of June, A. D. nineteen hundred and twenty-one.

JOHN W. STICKLEY. [L. S.]
AARON T. ROSSIGNOL. [L. S.]